(12) United States Patent
Chou (10) Patent No.: US 8,775,267 B2
(45) Date of Patent: Jul. 8, 2014

(54) COLLABORATIVE BARGAINING

(75) Inventor: Peilin Chou, Taipei (TW)

(73) Assignee: Bridgewell, Inc., Taipei (TW)

( * ) Notice: Subject to any disclaimer, the term of this patent is extended or adjusted under 35 U.S.C. 154(b) by 617 days.

(21) Appl. No.: 12/888,155

(22) Filed: Sep. 22, 2010

(65) Prior Publication Data

US 2012/0072297 A1    Mar. 22, 2012

(51) Int. Cl.
*G06Q 30/00* (2012.01)
*G06Q 30/08* (2012.01)
*G06Q 10/10* (2012.01)
*G06Q 30/06* (2012.01)
*G06Q 99/00* (2006.01)

(52) U.S. Cl.
CPC .............. *G06Q 30/08* (2013.01); *G06Q 10/101* (2013.01); *G06Q 30/06* (2013.01); *G06Q 99/00* (2013.01)
USPC ....................................................... 705/26.3

(58) Field of Classification Search
CPC ..................................................... G06Q 30/08
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 6,101,484 A * | 8/2000 | Halbert et al. ................ | 705/26.2 |
| 6,269,343 B1 * | 7/2001 | Pallakoff ...................... | 705/26.2 |
| 7,107,230 B1 | 9/2006 | Halbert et al. | |
| 7,124,107 B1 | 10/2006 | Pishevar et al. | |
| 7,401,034 B1 * | 7/2008 | Srivastava et al. ........... | 705/26.3 |
| 7,587,340 B2 | 9/2009 | Seidman et al. | |
| 7,610,233 B1 | 10/2009 | Leong et al. | |
| 7,765,141 B1 * | 7/2010 | Innocenti ........................ | 705/37 |
| 7,860,796 B2 * | 12/2010 | Levy ............................... | 705/45 |
| 8,036,950 B1 | 10/2011 | Schneur et al. | |
| 8,160,931 B2 | 4/2012 | Mesaros | |
| 8,266,002 B2 * | 9/2012 | Ramanathan et al. ........ | 705/26.1 |
| 2003/0004850 A1 * | 1/2003 | Li et al. .......................... | 705/37 |
| 2003/0229564 A1 * | 12/2003 | Reddi et al. ..................... | 705/37 |
| 2008/0082397 A1 * | 4/2008 | Dennison et al. ............... | 705/10 |
| 2009/0299906 A1 * | 12/2009 | Moshal ........................... | 705/80 |
| 2011/0125605 A1 | 5/2011 | Chatter et al. | |
| 2011/0173087 A1 | 7/2011 | Gipps et al. | |

OTHER PUBLICATIONS

John W. Byers et al. "A Month in the Life of Groupon", Copyright 2011 ACM.*
Dengji Zhao et al. "Multi-unit Double Auction under Group Buying", ECAI 2012.*
Linh Dang, "E-Commerce Strategies of Group Buying Websites", Lahti University of Applied Sciences, Spring 2013.*

(Continued)

*Primary Examiner* — Naeem Haq
(74) *Attorney, Agent, or Firm* — Douglas L. Weller (57) ABSTRACT

A collaborative bargaining system receives expressions of interest from potential buyers of an item. The collaborative bargaining system receives bids from sellers of the item. Each bid consists of a price per item based on a minimum quantity of items. A time limited exclusive opportunity is awarded to one seller of the item to obtain from the interest group a commitment to buy the minimum quantity of items at the price per item as bid by the one seller. Sales of the item are closed when the interest group commits to buy the minimum quantity of items.

19 Claims, 5 Drawing Sheets

(56) References Cited

OTHER PUBLICATIONS

Robert J. Kauffman et al. "Bid Together, Buy Together: On Efficacy of Group-Buying Business Models in Internet-Based Selling", Carlson School of Management, May 16, 2001.*

Arvind Sahay, "How to Reap Higher Profits With Dynamic Pricing", MITSloan Management Review, vol. 48, No. 4, Summer 2007.*

Groupon: Collective Buying Power; Excerpted from internet Sep. 22, 2010; http://www.groupon.com/faq.

* cited by examiner

COLLABORATIVE BARGAINING

BACKGROUND

The internet has increased the opportunity to sellers to cost-effectively advertise their goods to a geographically dispersed audience. Creative marketing strategies are employed by various websites to assist sellers in selling their goods. For example, a user can list goods and services on craigslist.org, can auction off items at ebay.com, liquidate products at ubid.com, create a virtual store at amazon.com and so on.

SUMMARY

In accordance with embodiments of the present invention, a collaborative bargaining system receives expressions of interest from potential buyers of an item. The collaborative bargaining system receives bids from sellers of the item. Each bid consists of a price per item based on a minimum quantity of items. The collaborative bargaining system awards a time limited exclusive opportunity to one seller of the item to obtain from the interest group a commitment to buy the minimum quantity of items at the price per item as bid by the one seller. Sales of the item are closed when the interest group commits to buy the minimum quantity of items.

DESCRIPTION OF THE EMBODIMENT

The present application sets out a collaborative bargaining system that provides a creative way for buyers as well as sellers to initiate and purchase goods. The result is a collaborative buying process that reduces risk for the seller and tends to minimize the price paid for goods by a buyer, creating a win-win situation for buyers and sellers.

Figure 1:
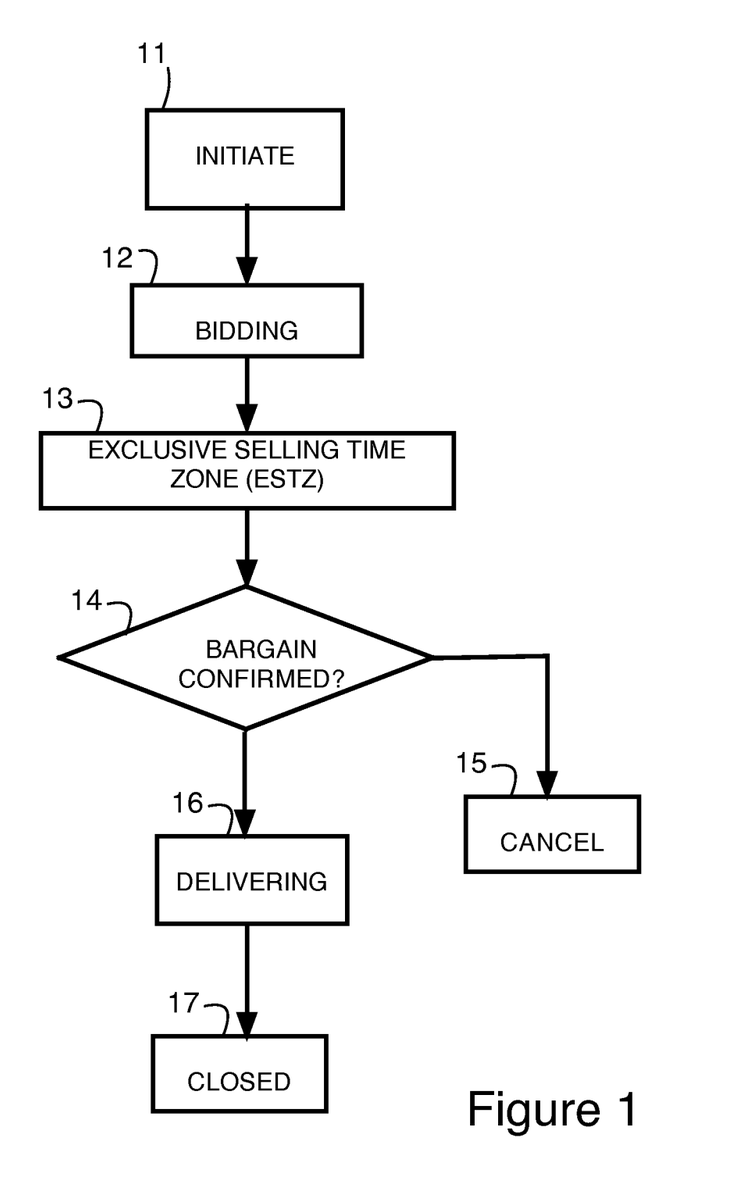
FIG. 1 is a simplified flowchart illustrating a collaborative bargaining process implemented by a collaborative bargaining system in accordance with an embodiment of the invention.

FIG. 1 is a simplified flowchart illustrating a collaborative bargaining process. In a block 11, a collaborative bargaining case is initiated by a potential buyer or seller registering a case profile in a case profile database in a collaborative bargaining system. At initiation, a specific item, such as a product (including manufacturer and product number) or a service, is described in the case profile in the case profile database in the collaborative bargaining system.

Once a case profile for an item is listed, in a block 12, buyers can express an interest in purchasing the item. All the buyers who express an interest in the listed product or service in a case profile can be referred to as members of an interest group for that product or service.

For example, members of an interest group submit to the collaborative bargaining system an instant notification contact channel. For example, the instant notification contact channel can be an e-mail address, a Microsoft network (MSN) address, a cell phone number, Facebook contact information, Twitter contact information, etc.

In order to increase the size, and thus the bargaining power, of the interest group, the interest group members can through their social networks, encourage others to join the interest group. For example, on a Facebook account the interest group member can provide information on the item and a web address where it is possible to join the interest group.

Sellers that are registered with the collaborative bargaining system will receive notification of any newly generated interest group for an item in a category in which the seller has requested notification. For example, in a user profile for the seller indicates categories of goods and services the seller is interested in selling. Upon receiving notification of a newly generated interest group the seller can access the case profile to determine the desired product or service as well as the size of the particulars of the interest group to determine whether to submit a quoted price to sell the item.

When registering, the seller selects a notification channel through which the seller is notified of the formation of particular interest groups. For example, the collaborative bargaining system allows the seller to set conditions under which notification occurs. For example the case profile for an item may have a time limit set for sellers to submit bids to sell the time. The bids are based on a minimum quantity of items to be sold. The minimum quantity is based on the size of the interest group and/or the number of items that the potential buyers in the interest group have expressed an interest in purchasing. The seller can request notification immediately at the opening of the case file, close to the time limit for sellers to submit bids, or anywhere in between. The seller can also request multiple or periodic notifications providing information, for example, on the size of the interest group and the bids of other sellers.

Potential buyers in an interest group indicate the potential quantity they are interested in and their level of interest in purchase at a stated price. For example, the level of interest can be an indication of interest with no obligation to buy. Alternatively, in some embodiments, a buyer may be able to put in a contractual bid that includes a commitment to buy at a certain stated price. Such a commitment may require, for example, the buyer to submit a deposit for all or may require, for example, the buyer to submit credit card information which will be charged upon shipment of a product or provision of a service.

Sellers quotations include a quoted price for an item. For example, a seller might indicate willingness to sell a product at $250 per product based on the potential of the interest group as a whole to purchase a minimum quantity, for example, 360, of the product.

Sellers bid against each other to produce the lowest product or service price based on the potential amount of the product or service that may be purchased by the interest group. This encourages members of the interest group to increase their numbers in order to entice sellers to reduce the quoted product price based on an increase in potential quantity. In some embodiments of the invention, bidding mechanisms are utilized to assure that successive seller bids decrease the quoted product price by a set amount or a set percentage (e.g., one percent or two percent) before the bid is accepted by the collaborative bargaining system. Bids submitted by a seller that do not decrease the quoted product price by the set amount or the set percentage are not received or published by the collaborative bargaining system.

Various auto-bidding mechanisms can be used by a seller. For example, a minimum quoted product price can be set by the seller where quoted prices are submitted to incrementally underbid a competing seller until the minimum quoted product price is reached.

In another preferred embodiment, a seller can set a price structure quote that lists different product prices at different product quantities which may be purchased by the interest group. As the interest group expands indicating interest in an increasing quantity of the item, the automated bidding mechanism will publish a quoted product price for the seller based on the potential quantity that might be purchased by the interest group. With this tool the bottom prices of competing sellers will emerge earlier.

A time limit for sellers to submit quotes is set for each case profile. The time limit can be, for example, a matter of hours, a matter of days or even longer. A time limit can be optimized, for example, to give sellers sufficient time to prepare and submit quotes and to give interest groups sufficient time to form and expand, but should be short enough to prevent members of the interest group from losing interest. Different time limits for case profiles therefore may be utilized for different categories of products and services.

Once the time limit for sellers to submit quotes is reached an exclusive selling time zone (ESTZ) is entered, as represented by a block 13 in FIG. 1. In the exclusive selling time zone, the seller with the lowest accepted quoted product price has the exclusive right to obtain commitments from members of the interest group to purchase the item. For example the exclusive selling time zone can be a matter of hours, a matter of days or even longer.

During the exclusive selling time zone, the collaborative bargaining system contacts the members of the interest group to obtain commitments from the interest group to purchase the quoted minimum quantity of the item at the minimum quoted price. Earlier commitments get priority when product is shipped. Members of the interest group can assist the seller by publicizing the minimum quoted price for the product to entice others to join the interest group during the exclusive selling time zone and commit to purchase the item at the minimum quoted price. All buyers that commit prior to the exclusive selling time zone or during the exclusive selling time zone are price protected so that they get minimum quoted price of the seller.

The Seller can disclose information that helps members of the interest group commit to purchase. For example, a seller may disclose how long it will take to deliver a product, the total quantity the seller has on hand, and so on. For example, a seller may disclose there are 200 units in stock which can be delivered right away, and 340 units that can be delivered within two weeks. Seller's disclosure will typically make such a disclosure at the beginning of the exclusive selling time zone, and may change the disclosure if circumstances change during the exclusive selling time zone.

As represented by block 14, at the end of the exclusive selling time zone, the collaborative system determines whether the bargain is confirmed. If the interest group commits to purchasing the minimum quantity of the product specified by the seller, the bargain is confirmed. If the interest group fails to commit to purchasing the minimum quantity of the product specified by the seller, but the seller is nevertheless willing to go through the sale of the item at the quoted price, the bargain also will be confirmed. Otherwise the collaborative bargaining deal will be canceled, as represented by a block 15.

When the collaborative deal is canceled, the collaborative bargaining system will refund to buyers any payments made as part of their commitment to purchase. At this point the interest group can be reset allowing other sellers to continue quoting prices. Payments to commit may be a payment of the full purchase price, deposit, that is a percentage of the full purchase price, or submission of a valid credit card information that is not charged until shipment is imminent.

The collaborative bargaining deal can be closed before the expiration of the exclusive selling time zone when a maximum quantity the seller will sell at the minimum quoted price is reached. This maximum quantity may be necessary due to a limit in the amount of stock the seller is able to or willing to obtain.

As represented by a block 16 once the collaborative bargain is accepted payment is received from the confirmed buyers and the items is delivered. In one embodiment of the invention, those buyers who first commit get priority on shipping. Also, all buyers get low price protection so that all buyers receive the item at the lowest price quoted by the seller. As represented by block 17, once delivery is completed the collaborative bargain is closed. Payments are made through the collaborative bargaining system; however, deliveries are handled by the seller. The seller confirms to the collaborative bargaining system that deliveries have been made.

Dissatisfied buyers who want to return the product are given a set return time period, for example, 7 days after receiving the item, to request refunds. For example, the buyer is responsible for shipping the purchased product back to the seller and payment will be refunded to such dissatisfied buyers after the seller confirms to the collaborative bargaining system the returned product has been received.

After expiration of the return period plus an additional amount of time, for example two weeks, the collaborative bargaining system makes payments to the sellers.

Figure 2:
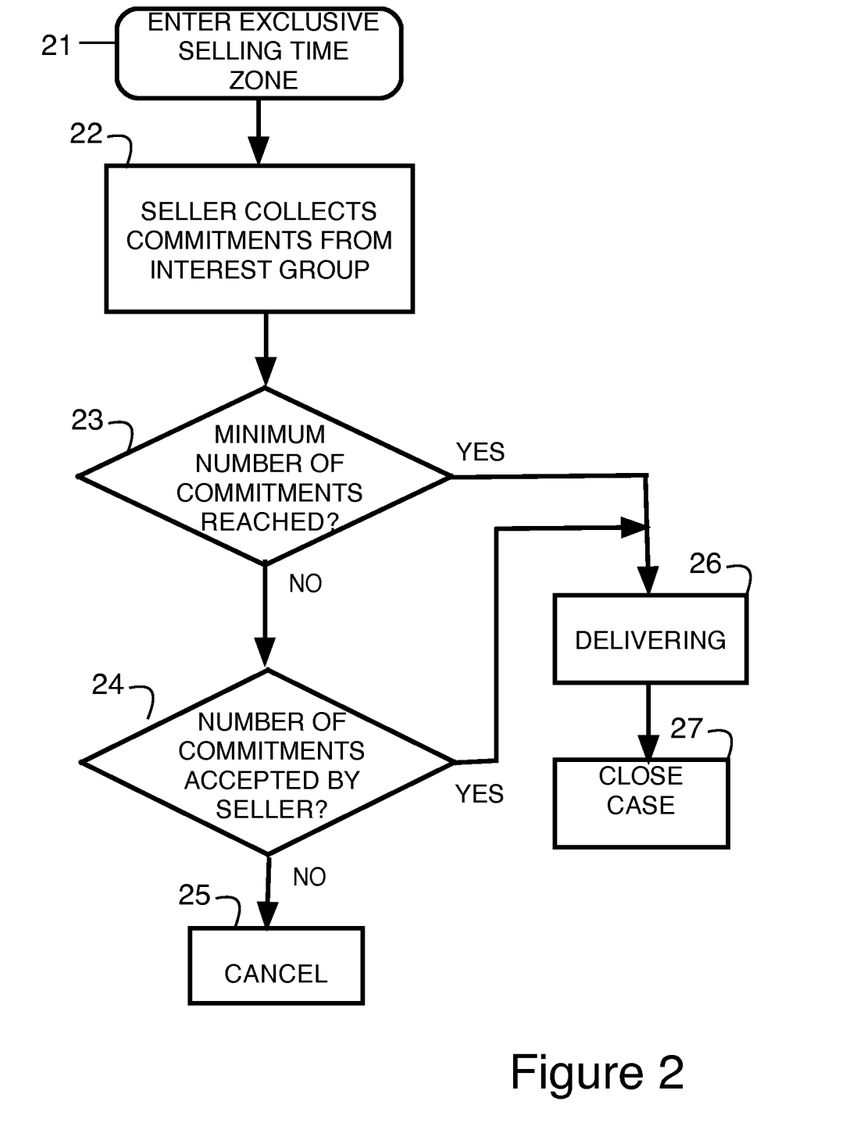
FIG. 2 is a simplified flowchart illustrating seller acceptance or rejection in a collaborative bargain in accordance with an embodiment of the invention.

FIG. 2 is a simplified flowchart illustrating seller acceptance or rejection of a collaborative bargain. In a block 21, the exclusive selling time zone is entered. In a block 22, the seller collects commitments from the interest group. In block 23, a check is made to see if a minimum number of commitments are collected. For example, the minimum number of commitments is based on the expressed interest of the interest group in the product. For example, the minimum number of commitments is the total number of products the interest group expressed interest in purchasing. Alternatively, the minimum number of commitments is some percentage (e.g., 60%) of the total number of products the interest group expressed interest in purchasing. Alternatively, the minimum number of commitments is calculated from the total number of products the interest group expressed interest in purchasing or the size of the interest group itself based on some mathematical formula.

If in block 23 the minimum number of commitments is reached, the collaborative bargain is consummated and the seller delivers the product, as represented by a block 26. After delivery the case is closed for the buyer, as is represented by a block 27. If in block 23, the minimum number of commitments is not reached, the seller has the option to accept or reject the collaborative bargain, as represented by a block 24. If the seller rejects the collaborative bargain because of insufficient buyer commitment, the case is canceled, as is represented by a block 25. If the seller accepts the collaborative bargain without the minimum number of commitments being reached, the seller indicates to the collaborative bargaining system the collaborative bargain is accepted and proceeds with delivering the product, as represented by a block 26. After delivery the case is closed, as is represented by block 27.

Figure 3:
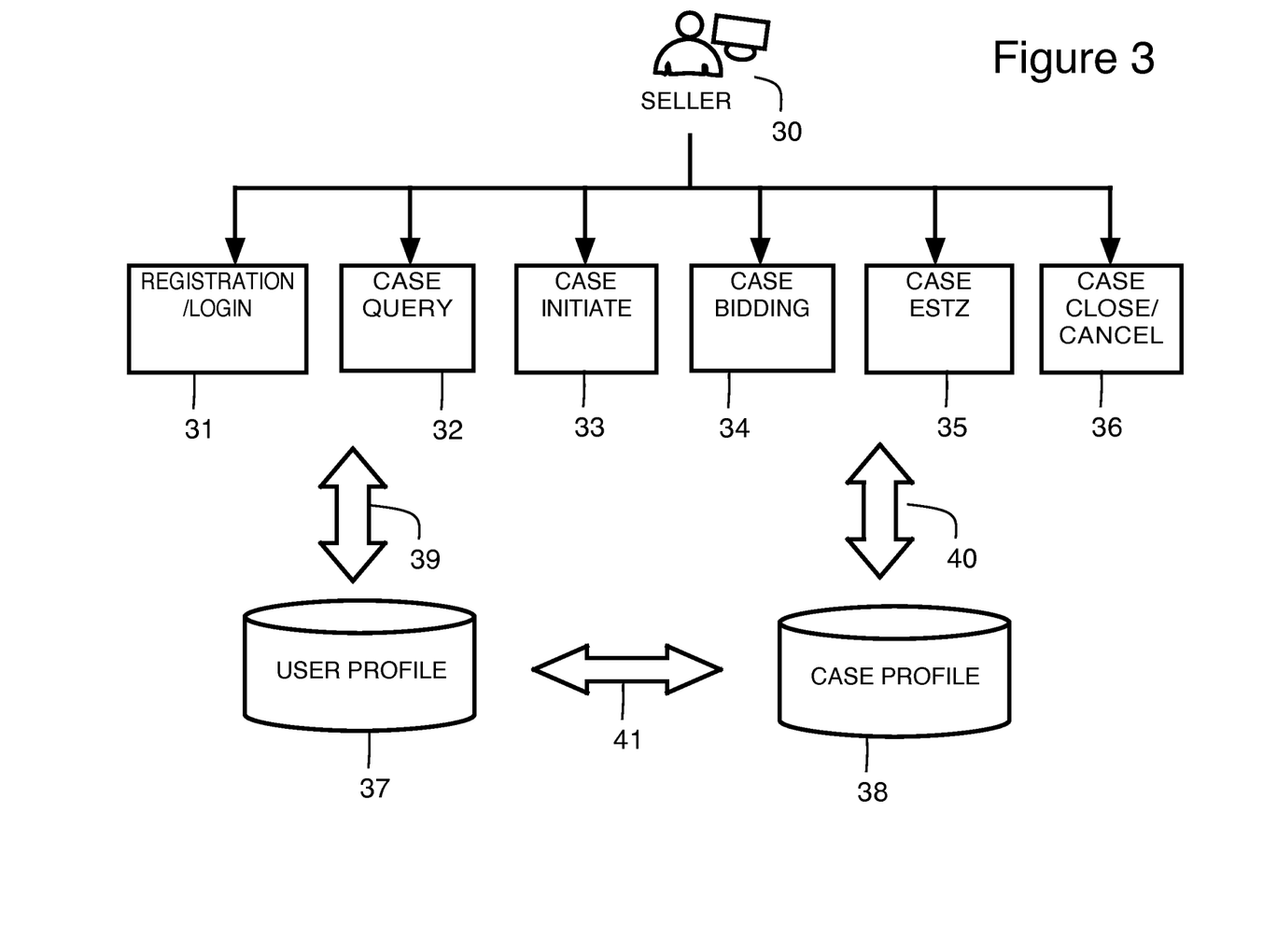
FIG. 3 is a simplified block diagram showing organization of a portion of a collaborative bargaining system that interacts with a seller in a collaborative bargaining process in accordance with an embodiment of the invention.

FIG. 3 is a simplified block diagram showing organization of a portion of a collaborative bargaining system that interacts with a seller 30 in a collaborative bargaining process. A registration and login bock 31 allows seller 30 to be identified by the system. Identifying information about seller 30 is stored in a user profile database 37. A case query block 32 allows seller 30 to find status of any case in the collaborative bargaining system. Case profiles are stored, for example, in a case profile database 38.

A case initiate block 33 allows seller 30 to initiate a collaborative bargaining case that is then stored in case profile database 38. A case bidding block 34 allows seller 30 to submit a quoted price to sell a quoted quantity of an item. Case bidding block receives bids from sellers of an item. Each bid consists of a price per item based on a quantity of sold items.

A case ESTZ block 35 allows seller 30 to, during an exclusive selling time zone, instigate and monitor the members of the interest group to obtain commitments from the interest group to purchase products or services at the minimum price quoted by seller 30. When seller 30 is a lowest bidder to sell a minimum quantity at a price per item bid by seller 30, ESTZ block 35 awards seller 30 a time limited exclusive opportunity to sell the minimum quantity of the item to the interest group at the price per item as bid by seller 30.

For example, when seller 30 is a lowest bidder to sell a minimum quantity at a lowest price per item, ESTZ block 35 closes sales of an item when the interest group commits to buy the minimum quantity of items as bid by seller 30. For example, ESTZ block 35 also closes sales of an item when the time limited exclusive opportunity to sell the minimum quantity of items expires, the interest group commits to buy less than the minimum quantity of items, and seller 30 agrees to sell less than the minimum quantity of items at the lowest price per item as bid by seller 30.

A case close and cancel block 36 interacts with seller 30 after expiration of the exclusive selling time zone. Case close and cancel block 36 cancels sales of an item when the time limited exclusive opportunity to sell the minimum quantity of items expires, the interest group commits to buy less than the minimum quantity of items, and the seller 30 does not agree to sell less than the minimum quantity of items at the lowest price per item as bid by seller 30. Case close block 36 provides winning sellers opportunity to give comments about a specific case.

An arrow 39 represents references and data transfer between user profile database 37 and collaborative bargaining system blocks 31 through 36. An arrow 40 represents references and data transfer between case profile database 38 and collaborative bargaining system blocks 31 through 36. An arrow 41 represents references and data transfer between user profile database 37 and case profile database 38.

Figure 4:
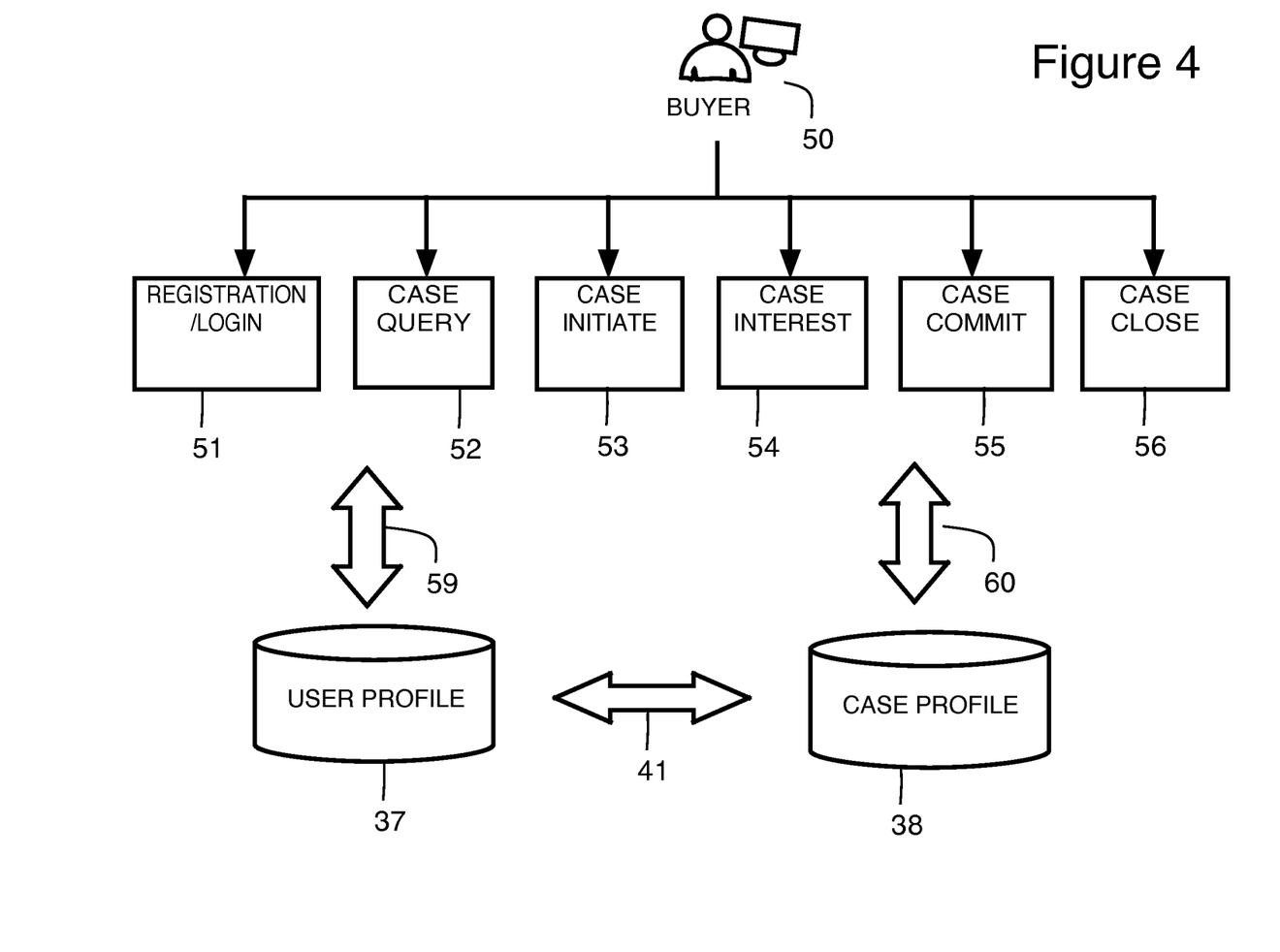
FIG. 4 is a simplified block diagram showing organization of a portion of a collaborative bargaining system that interacts with a buyer in a collaborative bargaining process in accordance with an embodiment of the invention.

FIG. 4 is a simplified block diagram showing organization of a portion of a collaborative bargaining system that interacts with a buyer 50 in a collaborative bargaining process. A registration and login bock 51 allows buyer 50 to be identified by the system. Identifying information about buyer 50 is stored in user profile database 37. A case query block 52 allows buyer 50 to find status of any case in the collaborative bargaining system. Case profiles are stored, for example, in case profile database 38.

A case initiate block 53 allows buyer 50 to initiate a collaborative bargaining case that is then stored in case profile database 38. A case interest block 54 allows buyer 50 to express interest in purchasing an item. Case interest block 54 places potential buyers of an item into an interest group for the item when the potential buyers of the item indicate to collaborative bargaining system 100 an interest in purchasing the item.

A case commitment block 55 allows buyer 50 to commit to purchase products or services at the minimum price quoted by a seller. A case close block 56 interacts with buyer 50 after expiration of the exclusive selling time zone until a case is either closed or canceled. Case close block 56 provides buyers opportunity to give comments about a specific case.

An arrow 59 represents references and data transfer between user profile database 37 and collaborative bargaining system blocks 51 through 56. An arrow 60 represents references and data transfer between case profile database 38 and collaborative bargaining system blocks 51 through 56. Arrow 41 represents references and data transfer between user profile database 37 and case profile database 38.

Figure 5:
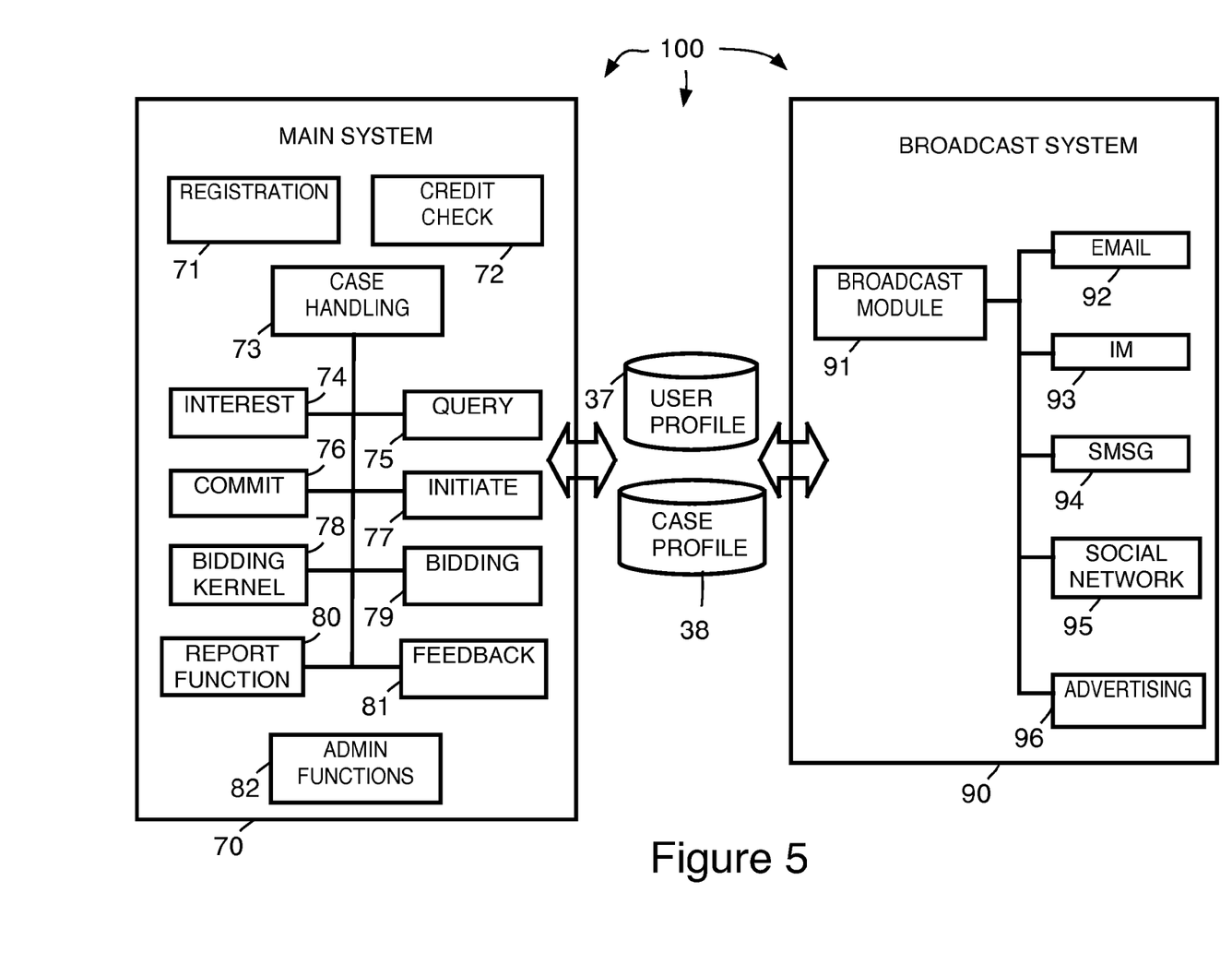
FIG. 5 is a simplified functional block diagram showing functional blocks of a collaborative bargaining system that implements a collaborative bargaining process in accordance with an embodiment of the invention.

FIG. 5 is a simplified functional block diagram showing functional blocks of a collaborative bargaining system 100 that implements the collaborative bargaining process. Within a main system 70, a registration block 71 implements registration of buyers and sellers in the collaborative bargain system. A credit check block 72 checks credit for buyers and sellers. A case handling block 73 oversees collaborative bargaining cases. Case handling block 73 oversees an interest block 74, a commit block 76, a bidding kernel 78, a report function 80 a query block 75, an initiate block 77, a bidding block 79 and a feedback block 81. Administration (admin) functions 82 oversees administrative functions of main system 70.

Within a broadcast system 90 a broadcast module 91 oversees communication with buyers and sellers. Contact channels used by broadcast module 91 include an e-mail channel 92, an internet messaging (IM) channel 93, a short message service gate (SMSG) channel 94, various social network channels 95 and advertising channels 96.

The collaborative buying process allows buyers and sellers to join together to create and realize attractive deals. The buyer achieves a low price while the seller achieves a high volume sale. Risk for both buyer and seller is minimized.

Through the process, sellers compete for a quantity order by aggressive price cutting based on quantity. The information about the products and services is publicized through communication channels of interest groups. As the size of an interest group increases, price competition among sellers for a large quantity sale also increases. Lower prices will tend, in turn to increase the size of the interest group.

Sometimes a buyer may be part of more than one interest group for similar products. Perhaps the buyer would be satisfied with a purchase of any of the products, but the buyer may ultimately desire to purchase only one, not all of the products. For example, the buyer might be interested in a laptop computer. There may be currently interest groups for a laptop computer from Apple Computers, from Dell, Inc., and from Hewlett-Packard Company. The buyer may be a member of interest groups for laptops from each of these companies, but only wants to buy a single laptop computer at the best price. If this information is disclosed to the sellers of these products, the sellers will realize that it is not just a competition among sellers of one product, but also a competition among sellers of multiple products. Even though a first seller may bid lower than other sellers of the same product, another seller of a different product may be competing for a purchase from the same buyers. A low quote by the other seller on a similar product may make it difficult for the first seller to obtain minimum quantity from the interest group for the first seller's product or service. Thus information about other interest groups for other collaborative bargaining cases of similar products aids the seller in providing a competitive quoted price for a product. This information can be made available to the seller by the collaborative bargaining system or by a buyer that wants to encourage competition among sellers to obtain a low price for a desired product or service The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A collaborative bargaining system comprising:
a database, including hardware, that physically stores a case profile;
a case interest block, the case interest block placing potential buyers of an item into an interest group for the item when the potential buyers of the item indicate to the collaborative bargaining system an interest in purchasing the item, the item being described in the case profile;
a case bidding block that receives bids from sellers of the item, each bid consisting of a price per item based on a minimum quantity of items to be sold;
an exclusive selling time block, executed by a computer, that awards one seller of the item a time limited exclusive opportunity for the one seller, exclusive of other sellers, to obtain from the potential buyers in the interest group a commitment to buy the minimum quantity of items at the price per item as bid by the one seller; and
a case close block that closes sales of the item when the one seller obtains from the potential buyers in the interest group the commitment to buy the minimum quantity of items at the price per item as bid by the one seller.

2. A collaborative bargaining system as in claim 1 wherein the item is a product or a service.

3. A collaborative system as in claim 1 wherein the minimum quantity of items is based on a size of the interest group.

4. A collaborative system as in claim 1 wherein the minimum quantity of items is based on a number of purchases that potential buyers in the interest group have expressed an interest in making.

5. A collaborative bargaining system comprising:
a database, including hardware, that physically stores a case profile;
a case interest block, the case interest block placing potential buyers of an item into an interest group for the item when the potential buyers of the item indicate to the collaborative bargaining system an interest in purchasing the item, the item being described in the case profile;
a case bidding block that receives bids from sellers of the item, each bid consisting of a price per item based on a minimum quantity of items to be sold;
an exclusive selling time block, executed by a computer, that awards one seller of the item a time limited exclusive opportunity for the one seller, exclusive of other sellers, to obtain from the potential buyers in the interest group a commitment to buy the minimum quantity of items at the price per item as bid by the one seller; and
a case close block that closes sales of the item when the time limited exclusive opportunity expires, the interest group commits to buy less than the minimum quantity of items, and the one seller agrees to sell less than the minimum quantity of items at the price per item as bid by the one seller.

6. A collaborative bargaining system as in claim 5 wherein:
the case close block cancels sales of the item when the time limited exclusive opportunity expires, the interest group commits to buy less than the minimum quantity of items, and the one seller does not agree to sell less than the minimum quantity of items at the price per item as bid by the one seller.

7. A collaborative bargaining system comprising:
a database, including hardware, that physically stores a case profile;
a case interest block, the case interest block placing potential buyers of an item into an interest group for the item when the potential buyers of the item indicate to the collaborative bargaining system an interest in purchasing the item, the item being described in the case profile;
a case bidding block that receives bids from sellers of the item, each bid consisting of a price per item based on a minimum quantity of items to be sold;
an exclusive selling time block, executed by a computer, that awards one seller of the item a time limited exclusive opportunity for the one seller, exclusive of other sellers, to obtain from the potential buyers in the interest group a commitment to buy the minimum quantity of items at the price per item as bid by the one seller; and
a case close block that cancels sales of the item when the time limited exclusive opportunity expires, the interest group commits to buy less than the minimum quantity of items, and the one seller does not agree to sell less than the minimum quantity of items at the price per item as bid by the one seller.

8. A computer implemented method performed by a collaborative bargaining system comprising:
placing potential buyers of an item into an interest group for the item when the potential buyers of the item indicate to the collaborative bargaining system an interest in purchasing the item;
receiving by the collaborative bargaining system bids from sellers of the item, each bid consisting of a price per item based on a minimum quantity of items;
awarding, by a computer, a time limited exclusive opportunity to one seller of the item for the one seller, exclusive of other sellers, to obtain from the potential buyers in the interest group a commitment to buy the minimum quantity of items at the price per item as bid by the one seller; and
closing sales of the item when the one seller, exclusive of other sellers, obtains from the potential buyers in the interest group the commitment to buy the minimum quantity of items at the price per item as bid by the one seller.

9. A computer implemented method as in claim 8 wherein the item is a product or a service.

10. A computer implemented method as in claim 8 wherein the minimum quantity of items is based on a size of the interest group.

11. A computer implemented method as in claim 8 wherein the minimum quantity of items is based on a number of purchases that potential buyers in the interest group have expressed an interest in making.

12. A computer implemented method performed by a collaborative bargaining system comprising:

placing potential buyers of an item into an interest group for the item when the potential buyers of the item indicate to the collaborative bargaining system an interest in purchasing the item;

receiving by the collaborative bargaining system bids from sellers of the item, each bid consisting of a price per item based on a minimum quantity of items;

awarding, by a computer, a time limited exclusive opportunity to one seller of the item for the one seller, exclusive of other sellers, to obtain from the potential buyers in the interest group a commitment to buy the minimum quantity of items at the price per item as bid by the one seller; and closing sales of the item when the time limited exclusive opportunity to sell the minimum quantity of items expires, the interest group commits to buy less than the minimum quantity of items, and the one seller agrees to sell less than the minimum quantity of items at a lowest price per item as bid by the one seller.

13. A computer implemented method as in claim 12 additionally comprising:

canceling sales of the item when the time limited exclusive opportunity to sell the minimum quantity of items expires, the interest group commits to buy less than the minimum quantity of items, and the one seller does not agree to sell less than the minimum quantity of items at the price per item as bid by the one seller.

14. A computer implemented method performed by a collaborative bargaining system comprising:

placing potential buyers of an item into an interest group for the item when the potential buyers of the item indicate to the collaborative bargaining system an interest in purchasing the item;

receiving by the collaborative bargaining system bids from sellers of the item, each bid consisting of a price per item based on a minimum quantity of items;

awarding, by a computer, a time limited exclusive opportunity to one seller of the item for the one seller, exclusive of other sellers, to obtain from the potential buyers in the interest group a commitment to buy the minimum quantity of items at the price per item as bid by the one seller; and canceling sales of the item when the time limited exclusive opportunity to sell the minimum quantity of items expires, the interest group commits to buy less than the minimum quantity of items, and the one seller does not agree to sell less than the minimum quantity of items at the price per item as bid by the one seller.

15. A computer implemented method performed by a collaborative bargaining system comprising:

receiving by the collaborative bargaining system expressions of interest from potential buyers of an item;

receiving by the collaborative bargaining system bids from sellers of the item, each bid consisting of a price per item based on a minimum quantity of items;

awarding, by a computer, a time limited exclusive opportunity to one seller of the item for the one seller, exclusive of other sellers, to obtain from the potential buyers in the interest group a commitment to buy the minimum quantity of items at the price per item as bid by the one seller; and closing sales of the item when the one seller obtains from the potential buyers in the interest group the commitment to buy the minimum quantity of items at the price per item as bid by the one seller.

16. A computer implemented method as in claim 15 wherein the minimum quantity of items is based on a size of the interest group.

17. A computer implemented method as in claim 15 wherein the minimum quantity of items is based on a number of purchases that potential buyers in the interest group have expressed an interest in making.

18. A computer implemented method performed by a collaborative bargaining system comprising:

receiving by the collaborative bargaining system expressions of interest from potential buyers of an item;

receiving by the collaborative bargaining system bids from sellers of the item, each bid consisting of a price per item based on a minimum quantity of items;

awarding, by a computer, a time limited exclusive opportunity to one seller of the item for the one seller, exclusive of other sellers, to obtain from the potential buyers in the interest group a commitment to buy the minimum quantity of items at the price per item as bid by the one seller; and closing sales of the item when the time limited exclusive opportunity to sell the minimum quantity of items expires, the interest group commits to buy less than the minimum quantity of items, and the one seller agrees to sell less than the minimum quantity of items at a lowest price per item as bid by the one seller.

19. A computer implemented method performed by a collaborative bargaining system comprising:

receiving by the collaborative bargaining system expressions of interest from potential buyers of an item;

receiving by the collaborative bargaining system bids from sellers of the item, each bid consisting of a price per item based on a minimum quantity of items;

awarding, by a computer, a time limited exclusive opportunity to one seller of the item for the one seller, exclusive of other sellers, to obtain from the potential buyers in the interest group a commitment to buy the minimum quantity of items at the price per item as bid by the one seller; and canceling sales of the item when the time limited exclusive opportunity to sell the minimum quantity of items expires, the interest group commits to buy less than the minimum quantity of items, and the one seller does not agree to sell less than the minimum quantity of items at the price per item as bid by the one seller.

* * * * *